(12) United States Patent
Riopelle (10) Patent No.: US 7,858,870 B2
(45) Date of Patent: *Dec. 28, 2010

(54) SYSTEM AND METHODS FOR THE CREATION AND PERFORMANCE OF SENSORY STIMULATING CONTENT

(75) Inventor: Gerald Henry Riopelle, Scottsdale, AZ (US)

(73) Assignee: Beamz Interactive, Inc., Scottsdale, AZ (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/075,748

(22) Filed: Mar. 10, 2005

(65) Prior Publication Data

US 2005/0223330 A1 Oct. 6, 2005

Related U.S. Application Data

(63) Continuation-in-part of application No. 10/219,821, filed on Aug. 16, 2002, now Pat. No. 6,960,715.

(60) Provisional application No. 60/312,843, filed on Aug. 16, 2001, provisional application No. 60/551,329, filed on Mar. 10, 2004.

(51) Int. Cl.
*G10H 1/06* (2006.01)

(52) U.S. Cl. ............................. 84/622; 84/609; 84/610; 84/625; 84/634; 84/649; 84/650; 84/659; 84/660; 84/666

(58) Field of Classification Search ........................ None
See application file for complete search history.

(56) References Cited

U.S. PATENT DOCUMENTS

| 2,314,038 | A | 3/1943 | Elting |
| 3,076,953 | A | 2/1963 | Sloop |
| 3,733,953 | A | 5/1973 | Ferber .................... 84/1.16 |
| 3,749,810 | A | 7/1973 | Dow ...................... 84/1.24 |
| 3,936,134 | A | 2/1976 | Piscionere, Sr. |
| 4,526,078 | A * | 7/1985 | Chadabe ................... 84/602 |
| 4,688,460 | A | 8/1987 | McCoy ..................... 85/1.16 |
| 4,736,662 | A | 4/1988 | Yamamoto ................ 84/1.09 |
| 4,968,877 | A | 11/1990 | McAvinney et al. ....... 250/221 |
| 4,974,482 | A | 12/1990 | Tamaki et al. ............. 84/653 |

(Continued)

FOREIGN PATENT DOCUMENTS

JP S63-503167 4/1987

(Continued)

OTHER PUBLICATIONS

Thru-beam fork sensor, Archive Press Release, Balluff, Inc. published on http://newsthomasnet.com/fullstory/9366/3919 (Mar. 20, 2002).

(Continued)

*Primary Examiner*—Marlon T Fletcher
(74) *Attorney, Agent, or Firm*—Robert C. Klinger (57) ABSTRACT

Systems and methods for creating and presenting sensory stimulating content. One aspect of the invention allows a composer to associate content with one or more triggers, and to define behavior characteristics which control the functioning of each trigger. Another aspect of the invention provides a variety of user interfaces through which a performer can cause content to be presented to an audience.

29 Claims, 11 Drawing Sheets

U.S. PATENT DOCUMENTS

| | | | | |
|---|---|---|---|---|
| 5,017,770 | A | 5/1991 | Sigalov | 250/221 |
| 5,045,687 | A | 9/1991 | Gurner et al. | 250/221 |
| 5,081,896 | A | 1/1992 | Hiyoshi et al. | 84/600 |
| 5,085,119 | A | 2/1992 | Cole | 84/730 |
| 5,369,270 | A | 11/1994 | Gurner et al. | 250/221 |
| 5,414,256 | A | 5/1995 | Gurner et al. | 250/221 |
| 5,442,168 | A | 8/1995 | Gurner et al. | 250/221 |
| 5,459,312 | A | 10/1995 | Gurner et al. | 250/221 |
| 5,475,214 | A | 12/1995 | DeFranco et al. | 250/221 |
| 5,668,333 | A | 9/1997 | Horton et al. | 84/470 R |
| 5,790,124 | A | 8/1998 | Fischer et al. | 345/435 |
| 5,989,120 | A | 11/1999 | Truchsess | 463/7 |
| 5,990,409 | A | 11/1999 | Takahashi et al. | 84/724 |
| 5,998,727 | A | 12/1999 | Toba et al. | 84/724 |
| 6,142,849 | A | 11/2000 | Horton et al. | 446/175 |
| 6,153,822 | A | 11/2000 | Toba et al. | 84/724 |
| 6,175,074 | B1 | 1/2001 | Takahashi et al. | 84/724 |
| 6,489,550 | B1 * | 12/2002 | Takahashi et al. | 84/724 |
| 6,492,775 | B2 * | 12/2002 | Klotz et al. | 315/120 |
| 6,501,012 | B1 | 12/2002 | Toba | 84/724 |
| 6,663,491 | B2 | 12/2003 | Watabe et al. | 463/36 |
| 6,685,480 | B2 * | 2/2004 | Nishimoto et al. | 434/247 |
| 6,738,044 | B2 | 5/2004 | Holzrichter et al. | 345/158 |
| 6,755,713 | B1 | 6/2004 | Weber et al. | 446/143 |
| 6,788,295 | B1 | 9/2004 | Inkster | |
| 7,504,577 | B2 * | 3/2009 | Riopelle | 84/723 |
| 2002/0047549 | A1 | 4/2002 | Klotz et al. | 315/149 |
| 2002/0097472 | A1 | 7/2002 | Oettinger et al. | |
| 2003/0070537 | A1 | 4/2003 | Nishitani et al. | 84/633 |
| 2005/0202890 | A1 | 9/2005 | Otten et al. | |
| 2005/0202891 | A1 | 9/2005 | Otten et al. | |
| 2005/0202892 | A1 | 9/2005 | Otten et al. | |
| 2005/0202893 | A1 | 9/2005 | Otten et al. | |
| 2007/0146347 | A1 | 6/2007 | Rosenberg | |

FOREIGN PATENT DOCUMENTS

| | | |
|---|---|---|
| JP | 2714455 | 5/1991 |
| JP | 3127597 | 3/1994 |
| JP | H07-55598 | 12/1995 |

OTHER PUBLICATIONS

"DirectMusic Producer" printouts from www.msdn.microsoft.com Microsoft Corporation.

PM128 Midibuddy Midi Controller, owners manual, Mar. 1998.

Alesis QSR Reference Manual DrumKAT Turbo Guide. DrumKAT Turbo Guide; drumKAT 3.5 Manual Sep. 1996.

* cited by examiner

SYSTEM AND METHODS FOR THE CREATION AND PERFORMANCE OF SENSORY STIMULATING CONTENT

PRIORITY CLAIM

The instant application is a continuation-in-part of, and claims the benefit of, U.S. patent Ser. No. 10/219,821, filed Aug. 16, 2002now U.S. Pat. No. 6,960,715 entitled "Music Instrument System and Method", which claims the benefit of U.S. Provisional Patent Application Ser. No. 60/312,843, filed Aug. 16, 2001, entitled "Music Instrument System and Method". The instant application also claims the benefit of U.S. Provisional Patent Application Ser. No. 60/551,329 entitled "Pulsed Beam Mode Enhancements", filed Mar. 10, 2004. The teachings of these applications are incorporated herein by reference in their entirety, including all appendices.

FIELD OF THE INVENTION

This invention relates to the composition and performance of sensory stimulating content, such as, but not limited to, sound and video content. More specifically, the invention includes a system through which a composer can pre-package certain sensory stimulating content for use by a performer. Another aspect of the invention includes an apparatus through which the performer can trigger and control the presentation of the pre-packaged sensory stimulating content. A common theme for both the composer and performer is that the pre-packaged sensory stimulating content is preferably chosen such that, even where the performer is a novice, the sensory stimulating data is presented in a pleasing and sympathetic manner.

SUMMARY OF THE INVENTION

The present invention allows a composer to arrange and package sensory stimulating content, or commands therefor, into "programs" for use by a performer. To simplify the description of the invention, reference will be primarily made to sensory stimulating content in the form of sounds and/or images. By way of example, without intending to limit the present invention, a program may contain one or more sound recordings, and/or one or more Musical Instrument Digital Interface ("MIDI") files. Unlike traditional sound recordings, MIDI files contain information about the sound to be generated, including attributes like key velocity, pitch bend, and the like. As such, a MIDI file may be seen as one or more commands for generating sensory stimulating content, rather than the content itself. Similarly, in a visually-enabled embodiment, a program may include still images, motion pictures, commands for presenting a still or motion picture, and the like. By way of example, without intending to limit the present invention, a program may include a three dimensional ("3D") model of a person, and movement and other characteristics associated with that model. Such a model can be seen as commands for generating the visual content, rather than the content itself.

While the description herein focuses primarily on auditory-oriented and visually-oriented content, the present invention should not be interpreted as limited to content with only visual and audio stimuli. Instead, it should be appreciated by one skilled in the art that the spirit and scope of the invention encompasses any sensory stimulating content, including scents, tastes, or tactile stimulation. By way of example, without intending to limit the present invention, a program may include instructions to trigger the release of a particular scent into the air using the scented bolus technology developed by MicroScent LLC of Menlo Park, Calif. and described in U.S. Pat. No. 6,357,726 to Watkins, et al., and U.S. Pat. No. 6,536,746, to Watkins, et al., the teachings of which are incorporated herein by reference in their entirety, or the teachings of U.S. Pat. No. 6,024,783, to Budman, which are incorporated herein in their entirety. Similarly, a program may include instructions to vibrate the seats in which the audience is sitting using a Bass Shaker, manufactured by Aura Sound, Inc. of Santa Fe Springs, Calif., or the ButtKicker line of tactile transducers manufactured by The Guitammer Company, Inc. of Westerville, Ohio, as described in U.S. Pat. No. 5,973,422 to Clamme, or to provide other tactile stimulation.

Each program preferably includes a plurality of segments of sensory stimulating content, as chosen and/or written by a composer. In an auditory-enabled embodiment, such content segments may include, but are not limited to, the above-described MIDI files and sound recordings. In a preferred embodiment, each program's content is selected such that the different segments, when presented to an audience, are sympathetic. U.S. patent application Ser. No. 10/219,821, the contents of which are incorporated herein by reference in their entirety, provides a detailed description of an auditory sympathetic program. It should be apparent to one skilled in the art that this concept can be applied to other types of content as well. By way of example, without limitation, in a visually-enabled embodiment, the color palette associated with still or motion images may be selected such that the colors, and/or the images as a whole, do not visually clash with each other.

The composer can also divide one or more programs into "songs". By way of example, without intending to limit the present invention, a song may include content for a "chorus" section, and separate content for a "verse" section. The present invention allows composers and/or performers to determine the point at which the song transitions from one content to another within each song, based on such factors as a presentation interval associated with the content, the performer activating one or more triggers, or the like. Again, although the terms used throughout this specification focus on auditory content, the terms are not intended to limit the invention to only auditory content. By way of example, the chorus section may include one set of still or motion images and scents, and the verse section may include a different set of still or motion images and scents.

Within each program, the composer preferably selects at least one content segment to serve as background content. By way of example, without intending to limit the present invention, in an auditory-enabled embodiment, the composer may select a series of sounds and/or rhythms which are intended to underlie a performance, such as a looped drum track. The remaining content segments can be assigned by the composer and/or performer to one or more triggers, as defined below.

Once a program has been created, a performer can utilize a program or set of programs as the basis for a performance. Unlike traditional music or other performances, wherein it is generally the performer's goal to accurately and consistently reproduce the content, the present invention gives the performer the freedom to innovate and create new and unique performances using the same program. For example, the performer can control the timing with which some or all content segments are presented to the audience, can transpose the content, and otherwise control the performance.

The performer causes content playback to begin by activating one of a plurality of triggers associated with the system. Such triggers may include, but are not limited to, one or more user interface elements on a computer screen; a key on a computer keyboard, number pad, touch screen, joy stick, or the like; a key on a musical keyboard, string on a guitar, or the like; a MIDI-generated trigger from a MIDI controller; and environmental monitors, such as microphones, light sensors, strain gauges, or the like. In general, activating a specific trigger will cause the content selected by the composer as background content to be presented.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS OF THE INVENTION

As described above, the present invention allows a composer to pre-package content which is used by a performer to present the content to an audience. To cause content to be presented, the performer activates one of a plurality of triggers.

Figure 1:
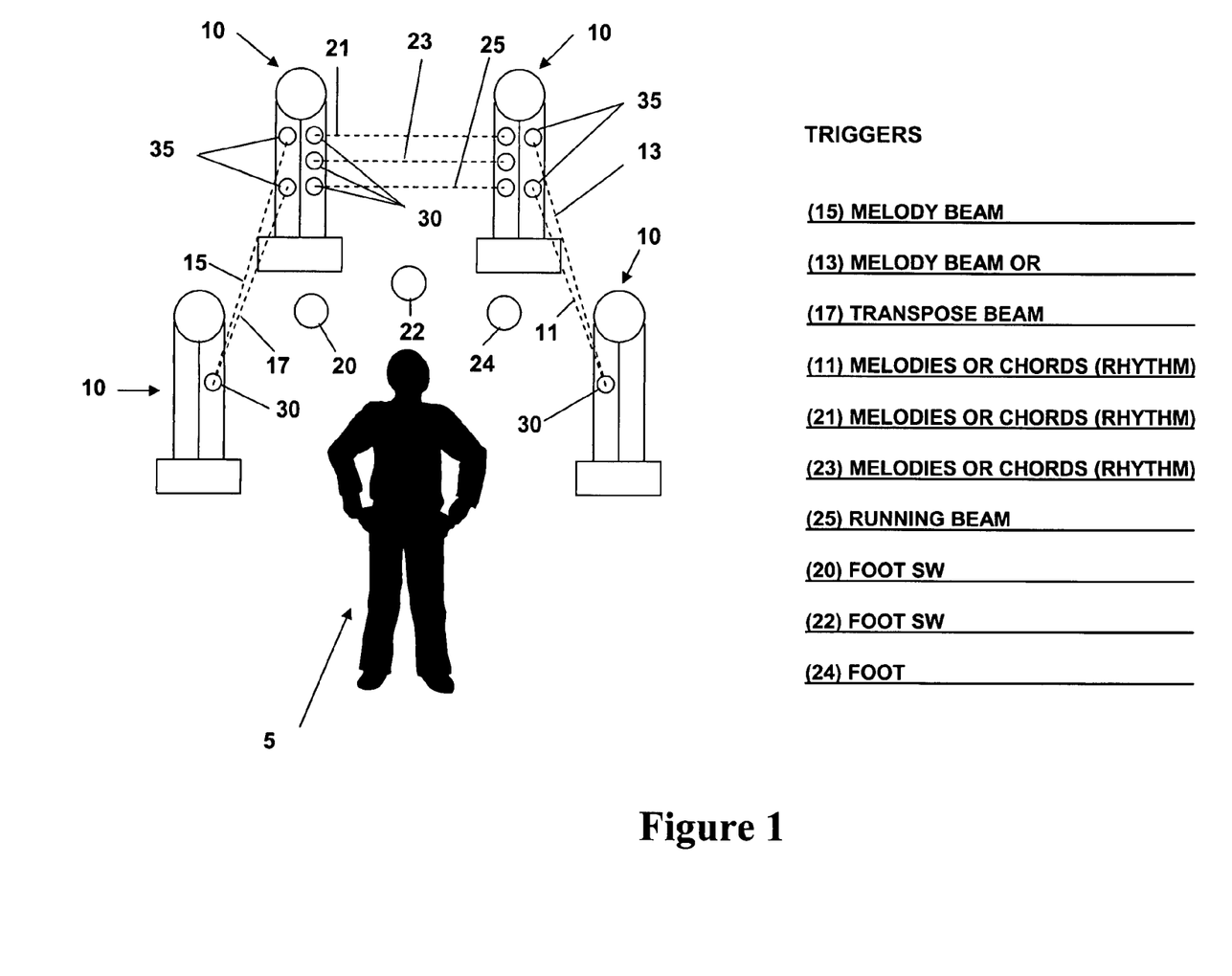
FIG. 1 is a block diagram of a content presentation user interface.

FIG. 1 is a block diagram of one embodiment of a content presentation user interface. In FIG. 1, block 5 represents the performer. In the illustrated embodiment, the performer stands between posts 10, and is surrounded on three sides by light beams 11, 13, 15, 17, 21, 23, and 25. Light emitters 30 generate the light beams, and the light beams are preferably aimed at light detectors 35. Light detectors 35 are attached to, or embedded in, posts 10, and each serves as a trigger for the system. The three foot switches, blocks 20, 22, and 24, represent additional triggers that are available to the performer. Each time the performer breaks light beams 11 or steps on foot switches 20, 22, or 24, this activates the trigger associated with the light beam or switch. A corresponding signal is then sent to a computer, synthesizer, scent generator, or other such device, and causes the presentation of content associated with the activated trigger.

Figure 2:
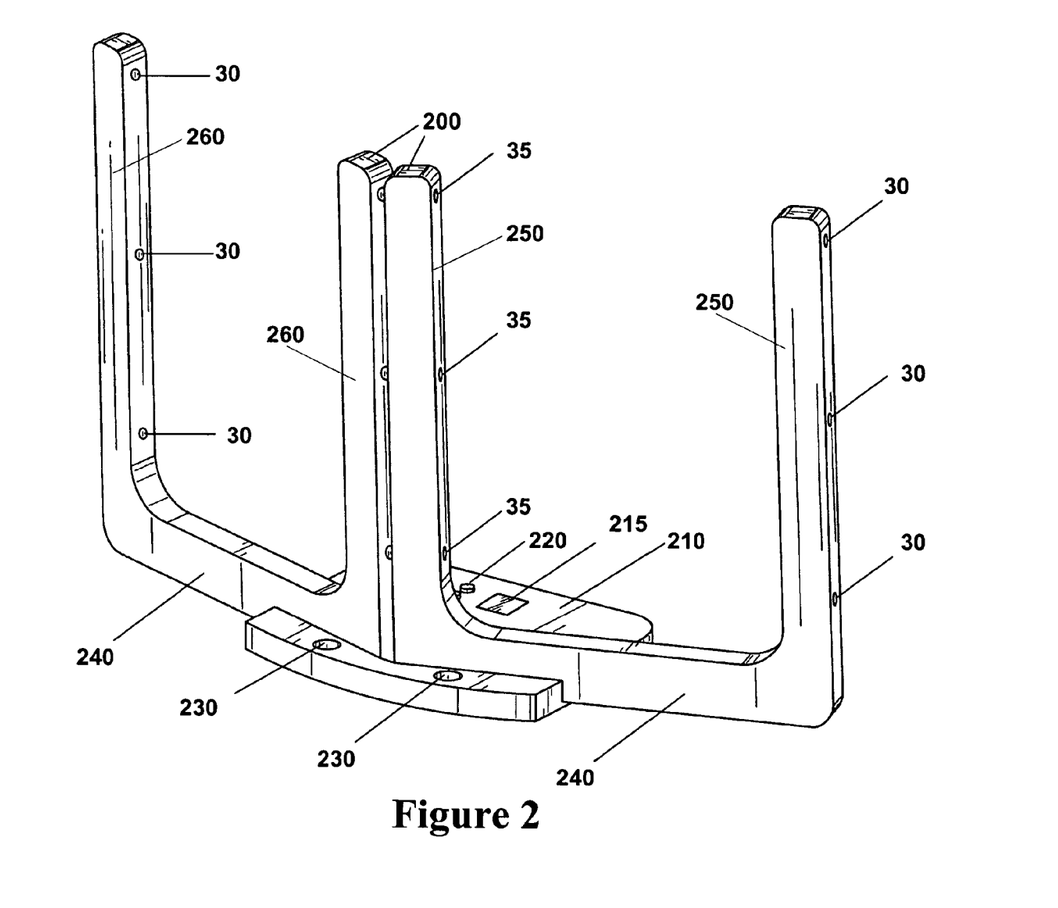
FIG. 2 is a rear perspective view of a portable, table-top content presentation user interface.
Figure 3:
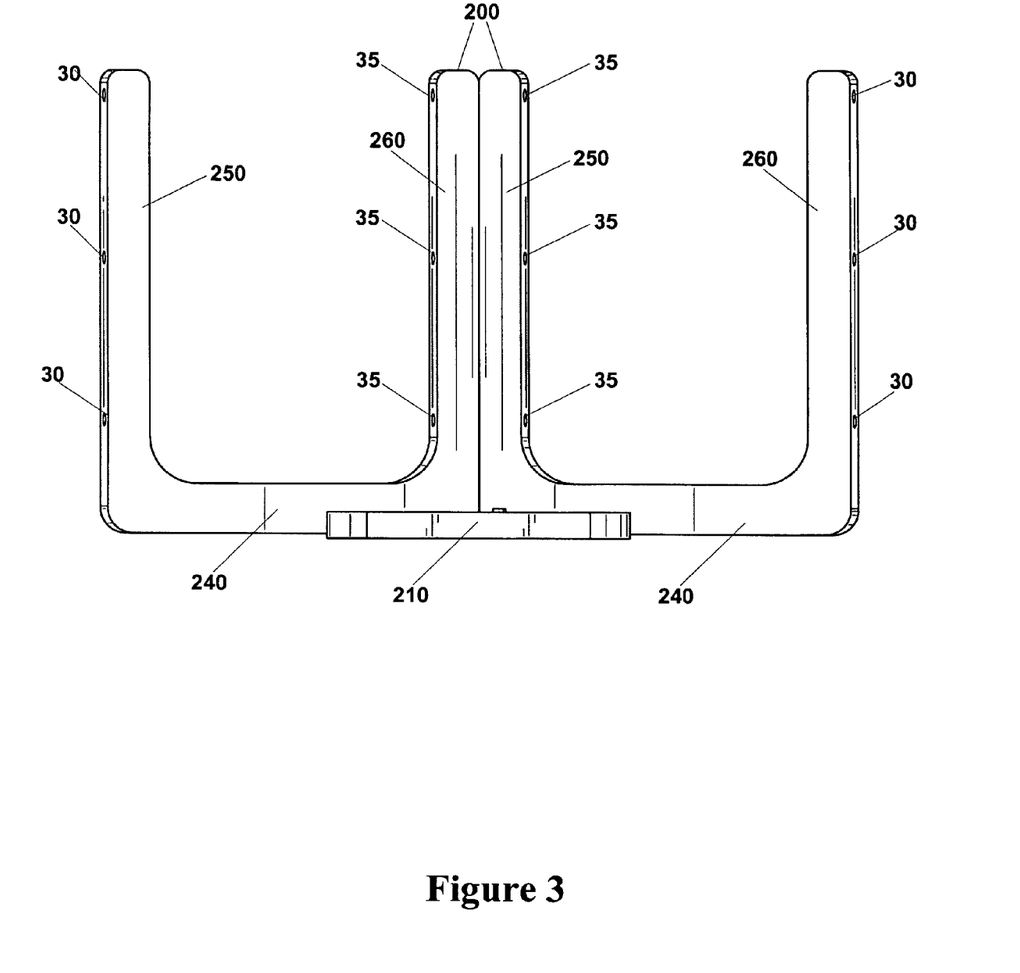
FIG. 3 is a front plan view of the portable, table-top content presentation user interface of FIG. 2.
Figure 4:
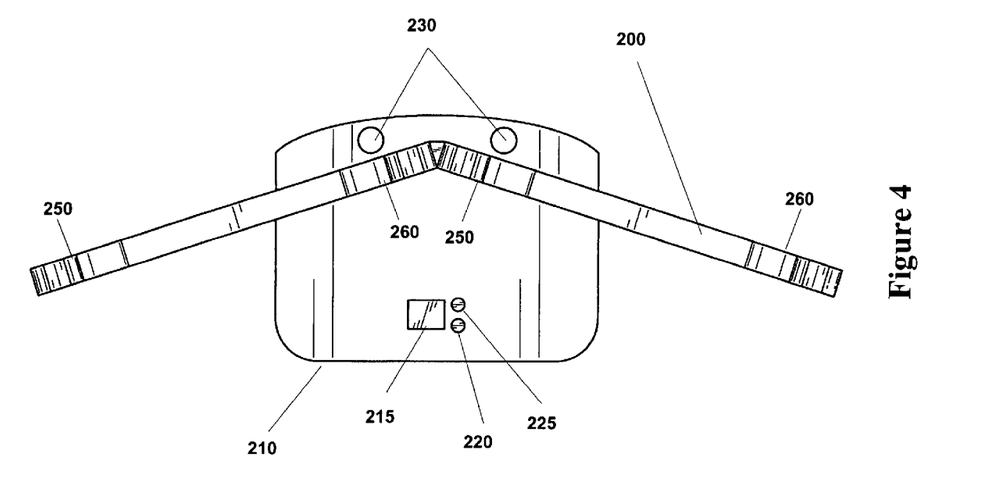
FIG. 4 is a top plan view of the of a portable, table-top content presentation user interface of FIG. 2.

FIG. 2 is a rear perspective view of a portable, table-top content presentation user interface. FIG. 3 is a front plan view of the portable, table-top content presentation system illustrated in FIG. 2. FIG. 4 is a top plan view of the portable, table-top content presentation system illustrated in FIG. 2. In FIGS. 2-4, corresponding components are similarly labeled for clarity. In the embodiment illustrated in FIGS. 2-4, light emitters 30 and light detectors 35 are preferably embedded within each arm (250, 260) of "U" shaped members 200, thereby simplifying aiming of the light beams and reducing the likelihood that the emitters or detectors will be misaligned during transport.

Members 200 can be easily attached to base 210 by inserting base 240 of members 200 into an appropriately sized groove in base 210. This allows base 210 to support members 200; places members 200 at a comfortable, consistent angle; and allows members 200 to be electronically connected to base 210 via cables (not illustrated) that plug into ports 230.

Base 210 also preferably includes switches 220 and 225, and a display 215. Switches 220 and 225 can be configured to allow a performer to switch from program to program, or from segment to segment within a program; adjust the intensity with which the content is presented; adjust the tempo or pitch at which content is presented; start or stop recording of a given performance; and other such functions. Display 215 can provide a variety of information, including the program name or number, the segment name or number, the current content presentation intensity, the current content presentation tempo, or the like.

When the embodiment illustrated in FIG. 2 is active, light emitters 30 generate light beams which are detected by light detectors 35. Each time the performer breaks the light beams or activates one of switches 220 or 225, the trigger associated with the light beam or switch is activated. In one embodiment, a corresponding signal is sent to a computer, synthesizer, scent generator, or other such device via a Universal Serial Bus (USB) or other such connection. Such a signal causes the device to present the content associated with the activated trigger.

In an alternative embodiment, base 210 and/or members 200 may also contain one or more speakers, video displays, or other content presentation devices, and one or more data storage devices, such that the combination of base 210 and members 200 provide a self-contained content presentation unit. In this embodiment, as the performer activates the triggers, base 210 can cause the content presentation devices to present the appropriate content to the audience. This embodiment can also preferably be configured to detect whether additional and/or alternative content presentation devices are attached thereto, and to trigger those in addition to, or in place of, the content presentation device(s) within the content presentation unit.

Figure 11:
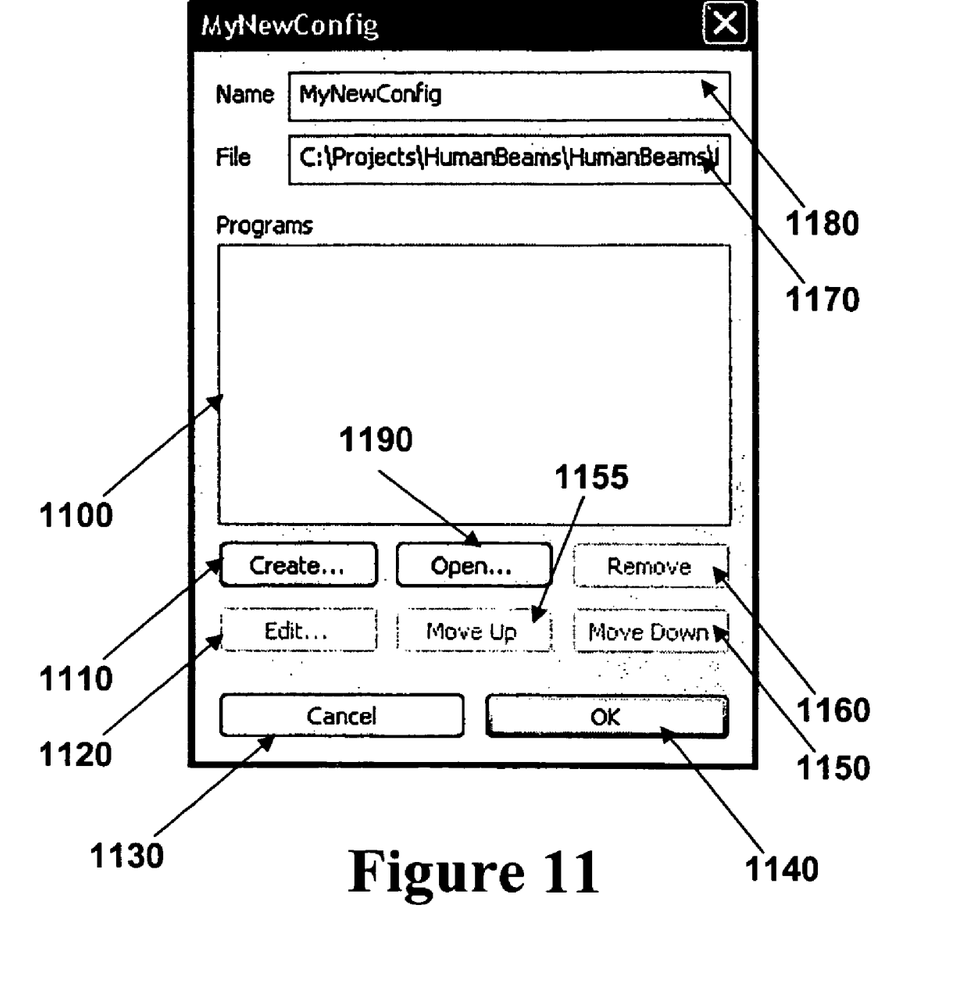
FIG. 11 is a screen capture of a sample system-level configuration file creation user interface.

FIG. 11 illustrates still another content presentation user interface embodiment. In this embodiment, a plurality of "U" shaped members 200 are attached to each other, thereby obviating the need for a base and increasing the number of triggers associated with the user interface. Because a preferred embodiment utilizes clear material for members 200, the additional members 200 are illustrated in phantom for clarity. This embodiment readily allows a plurality of content presentation devices to be attached to each other, and positioned at varying angles with respect to each other. By way of example, without intending to limit the present invention, such an embodiment can allow multiple performers to create content presentations together using a single user interface, or allow a performer to increase the number of triggers available for a given performance.

Although the description provided above of the embodiments illustrated in FIGS. 1-4 and 11 focuses on light beams, it should be apparent to one skilled in the art that alternative forms and wavelengths of energy, including ultrasound, radio frequency, and the like, may be substituted therefor without departing from the spirit or the scope of the invention. Still further, it should be apparent to one skilled in the art that although the triggers disclosed above do not require the performer to touch the trigger in order to activate it, tactile triggers may be substituted therefor without departing from the spirit or the scope of the invention. By way of example, without intending to limit the present invention, in the embodiment illustrated in FIG. 1, strings may be stretched between posts 10, with strain gauges substituted for light emitters 30 and/or light detectors 35. As the performer plucks, touches, or otherwise engages the string, the strain gauge may record the difference in pressure. When the difference in pressure is greater than a pre-defined threshold, the trigger associated with the string may be activated.

Figure 6:
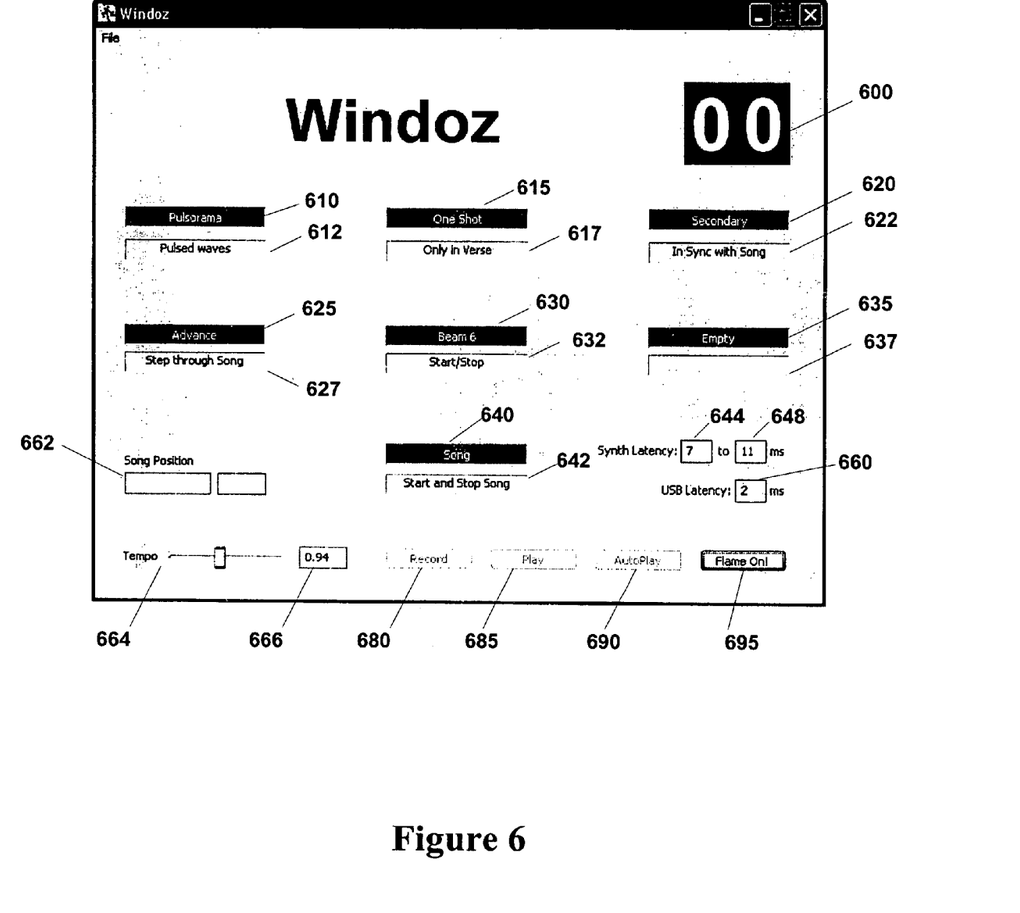
FIG. 6 is a screen capture of a computer based content presentation and content editing user interface.

FIG. 6 is a screen capture of a computer based content presentation and content editing user interface. In this embodiment, user interface elements 610, 615, 620, 625, 630, 635, and 640 represent individual triggers which can be activated by the performer. In one embodiment, the user interface elements are presented on a touch-screen or other such two-way user interface. In this embodiment, the trigger is activated when the performer touches the surface of the touch screen. This allows the performer to activate a plurality of triggers at the same time, just as with the physical interfaces described above in relation to FIGS. 1-4 and 11.

In an alternative embodiment, user interface elements 610, 615, 620, 625, 630, 635, and 640 may be presented via a traditional computer monitor or other such one-way user interface. In such an embodiment, and at the performer's preference, the performer can activate the trigger associated with a user interface element by simply positioning a cursor or other pointing device over the appropriate user interface element. Alternatively, the performer may be required take a positive step, such as clicking the button on a mouse or joystick, pressing a keyboard button, or the like, when the cursor is located over a given user interface element. The later alternative has the added benefit of limiting the likelihood that the performer will unintentionally activate a given user interface element.

For simplicity purposes, the description of the invention provided herein describes a user interface with seven triggers, or "beams". However, it should be apparent to one skilled in the art that the number of triggers can be readily increased without departing from the spirit or the scope of the invention. Furthermore, reference to a trigger as a "beam" should not be deemed as limiting the scope of the invention to only electromagnetic waves. It should be apparent to one skilled in the art that any trigger can be substituted therefor without departing from the spirit or the scope of the invention.

Figure 5:
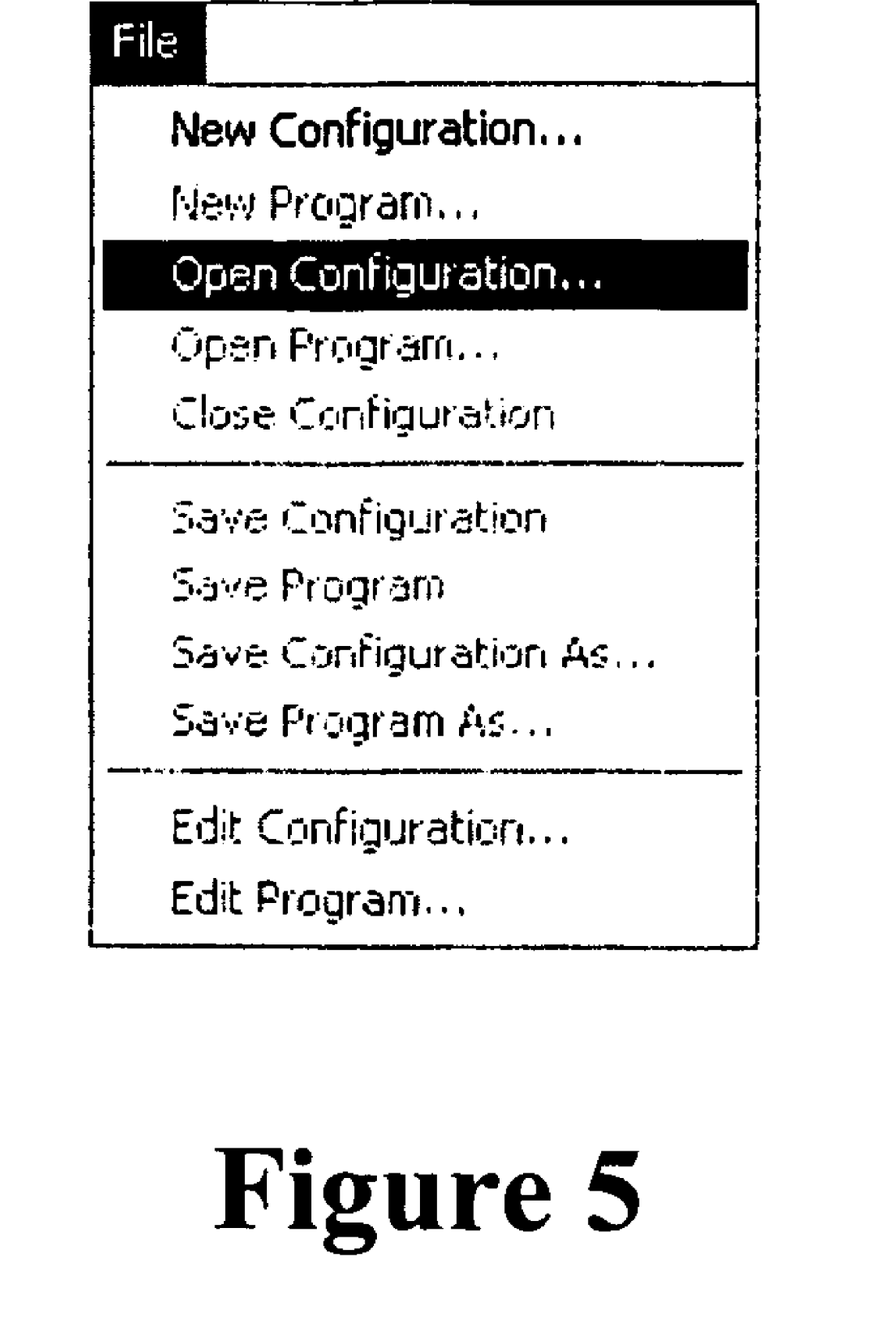
FIG. 5 is a sample user interface menu.

The user interface illustrated in FIG. 6 includes triggers 610, 615, 620, 625, 630, 635, and 640. The behavior of each trigger is preferably customizable by allowing the composer to change one or more control parameters. Such customization can occur via a user interface similar to that illustrated in FIG. 9, which can be selected via a user interface menu similar to that of FIG. 5, or by clicking on a trigger from FIG. 6 while the triggers are disabled (described below).

Figure 9:
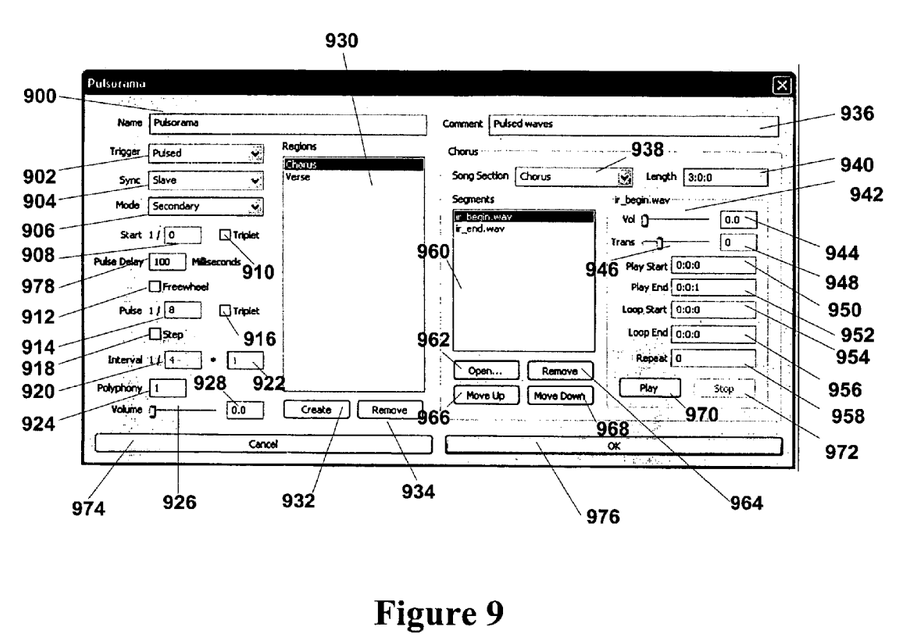
FIG. 9 is a screen capture of a sample trigger control parameter customization user interface.
Figure 10:
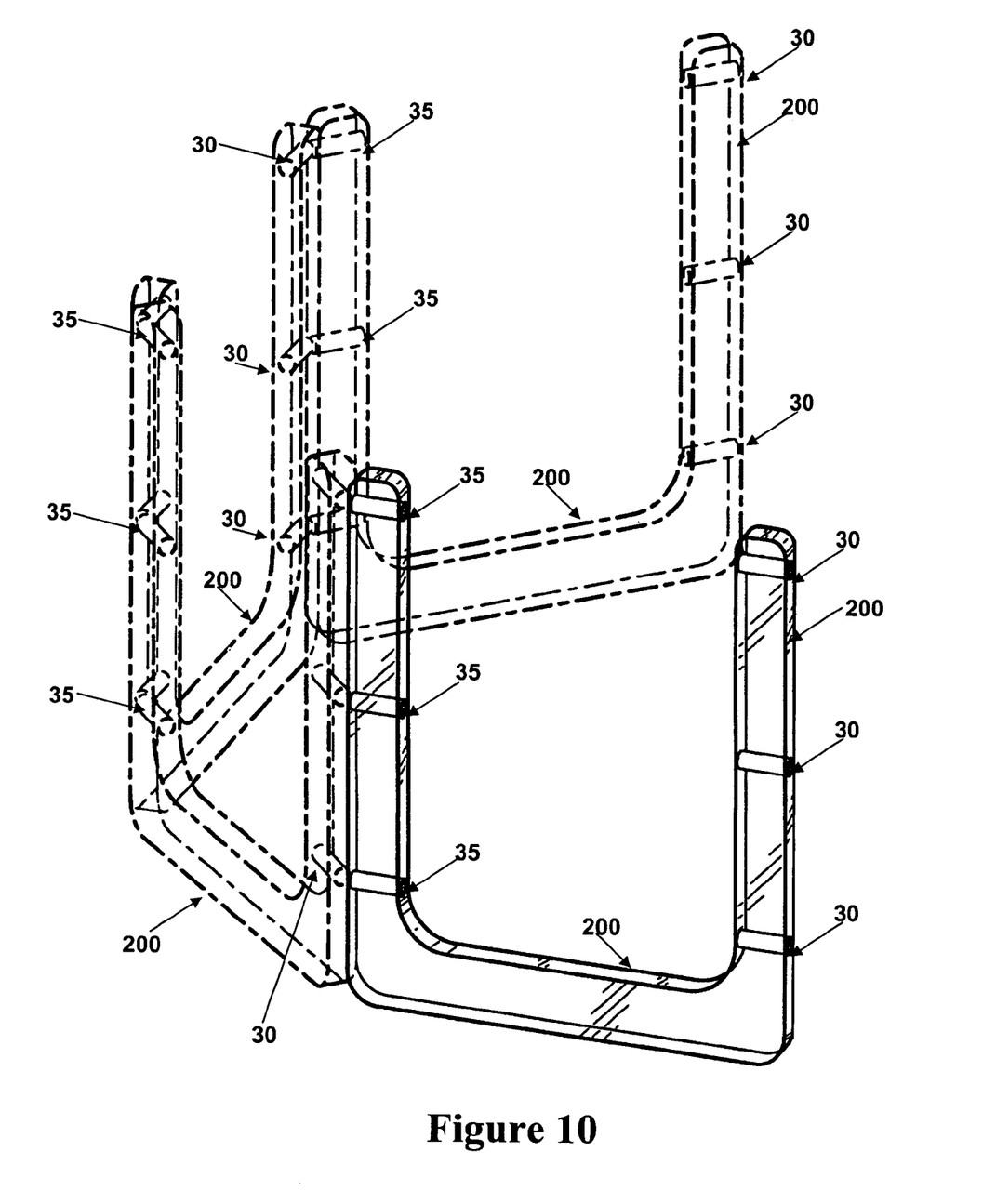
FIG. 10 is a perspective view of an alternative content presentation user interface embodiment.

The control parameters control various aspects of the content or content segment presented when a given trigger is activated. By way of example, without intending to limit the present invention, an auditory-enabled embodiment, such aspects may include, but are not limited to, trigger type 902, synchronization ("sync") 904, mode 906, start resolution 908, pulse delay 978, pulse resolution 914, freewheel 912, step 918, step interval 920, polyphony 924, volume 926, and regions 930. It should be apparent to one skilled in the art that alternative aspects may be added or substituted for the aspects described above without departing from the spirit or the scope of the invention.

Trigger type 902 establishes the general behavior of a trigger. More specifically, this establishes how a trigger behaves each time the trigger is activated and/or deactivated. In a preferred embodiment, the trigger types include, but are not limited to:

Start/Stop: Start/Stop trigger mode starts or stops the Segment every time the trigger is activated. That is, the trigger is activated once to start the content presentation, and when the trigger is activated again, content presentation stops. If the trigger is activated a third time, the content presentation starts at the beginning of the content segment. However, if the trigger is slaved (described below) with a song currently performing, it preferably resumes at the current position within the song instead of playing from the top. If more than one content segment is associated with the trigger, it cycles through them, but always starts at the beginning of each content segment.

Start/Pause: Start/Pause trigger mode is almost the same as Start/Stop with one important difference. When the trigger is activated the third time, content presentation resumes where it left off when the trigger was activated the second time. Only when the end of a content segment is reached will the next content segment in the set be presented. However, like Start/Stop, when synchronized to a song, playback always resumes at the current position in the song.

Momentary/Stop: Momentary/Stop trigger mode is similar to Start/Stop except that it reacts to both activation and deactivation of the trigger. Activating the trigger will start content presentation. Releasing, unblocking, or otherwise deactivating the trigger will cause content presentation to cease.

Momentary/Pause: Like Momentary/Stop, the Momentary/Pause trigger mode builds on Start/Pause by responding to both trigger activation and deactivation to start and stop content presentation.

Pulsed: Pulsed trigger mode causes reactivation of the trigger. Once the trigger is activated, it cycles through presentation of new content segments at the rate defined by the Pulse menu (described below). To do so, it cycles through a defined list of content segments that are associated with the trigger. When the trigger is deactivated, the content segment(s) currently being presented will continue to be presented until finished, or when replaced by a subsequent pulsed content segment (see Polyphony below.)

One Shot: One Shot mode is similar to pulsed trigger mode in that it triggers a content segment to play. However, unlike pulsed trigger mode, only a single content segment is presented regardless of how long the trigger is activated.

Song Advance: This special trigger mode does not directly control content presentation. Instead, it increments the song to the next content section or set of content sections. The timing of the switch can be set by the start resolution, described below, so that the switch occurs on a musically pleasing boundary.

A region 930 is a set of one or more content segments that are presented when a corresponding song section is selected. A trigger can contain a set of regions 930, one for each section within the song. The trigger can also have a default region, which plays when there is no active song or if the trigger is ignoring the song (i.e. if synchronization set to none, as described below).

Each region 930 carries at least two pieces of information, the section with which it is to synchronize (illustrated in FIG. 9 by drop-down box 938), and a list of one or more content segments (illustrated by segments list 960) to be presented. There is preferably no limit to the number of content segments with which a region may be associated, and new content segments can be added or removed by clicking on buttons 962 and 964, respectively. Each region preferably presents the content segments according to a composer-defined order, cycling back to the top when end of the list is reached. In the embodiment illustrated in FIG. 9, the order can be changed by clicking on a content segment in list 960, and then clicking the Move Up 966 or Move Down 968 button, as appropriate. A content segment can appear in list 960 more than once, if so desired.

It should be noted that logically, sections and regions are not the same. Sections define the layout of a song (described below), whereas regions define what a trigger should present when the song has entered a specific section. To keep things easy, the matching of a region to a section can be accomplished by using the same name.

Figure 8:
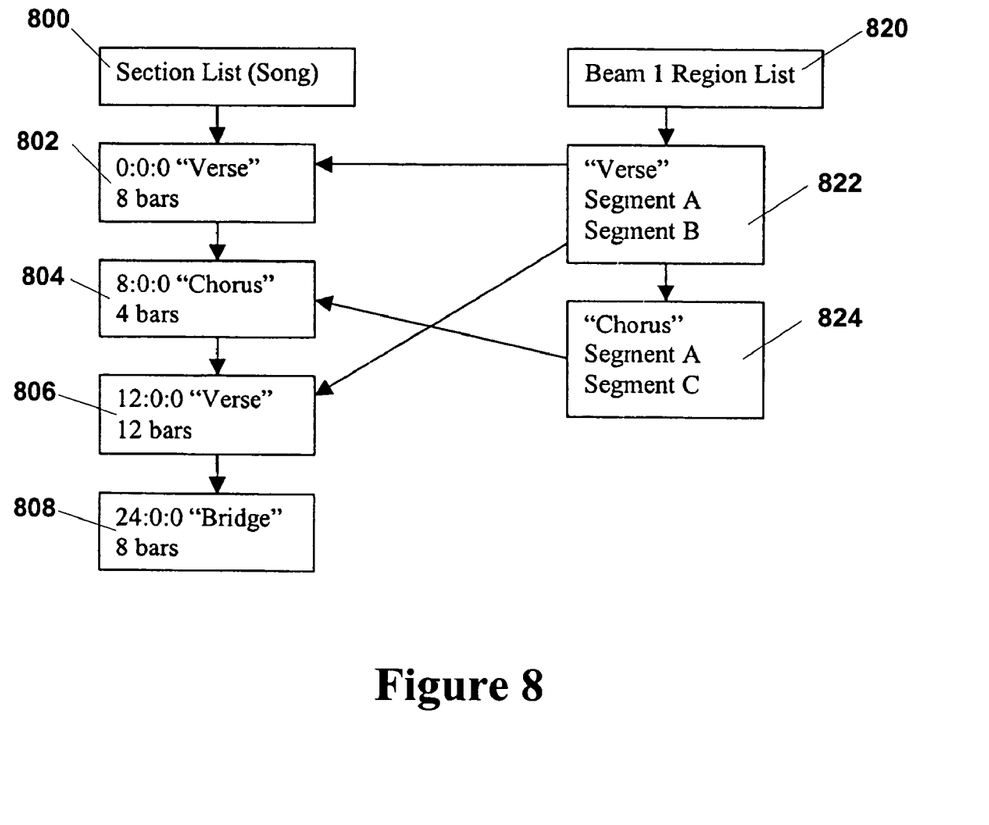
FIG. 8 is a block diagram illustrating the interrelationship between sections and regions.

FIG. 8 illustrates the relation of a program's song section list (Block 800) to a given trigger's region (Block 820). In FIG. 8, the song lays out a performance where the "Verse" section (Block 802) is presented for 8 intervals, the "Chorus" section (Block 804) is presented for 4 intervals, the "Verse" section (Block 806) is presented for 12 intervals, and the "Bridge" section (Block 808) is presented for 8 intervals. Meanwhile, the trigger is configured with just two regions, "Verse" and "Chorus". Region "Verse" has two content segments in it, Segment A and Segment B. Region "Chorus" includes two content segments, Segment A and Segment C. Note that a "Bridge" region is not defined. When the song enters the first "Verse", the content segments in the "Verse" region are presented. When the song then enters the "Chorus" section, the trigger switches to its "Chorus" region and presents the segments specified therein. Then, when the Song enters the second "Verse" section, the trigger switches back to the original "Verse" region and uses those Segments again. Finally, when the Song enters the "Bridge" section, the trigger stops presenting content because a matching Region is not defined.

Not shown are the region lists for other triggers. Each trigger carries its own mapping of regions to sections. By way of example, without intending to limit the present invention, another trigger might have regions defined for all three sections ("Verse", "Chorus", and "Bridge"), with different content in each, while still another trigger might have only a "Default" region, which provides content segments to be presented when the song is not actively running.

Synchronization 904 determines how a trigger relates to other triggers in the context of a song. A preferred embodiment of the present invention allows for three different synchronization types:

None: The trigger is not treated as part of a song, and plays on its own.
Master: The trigger controls the playback of a song. If the trigger is in Play/Stop or Play/Pause mode, it starts and stops the song performance. If the trigger is in Song Advance mode, it moves the song to the next section or program with each activation of the trigger.
Slave: The trigger synchronizes content presentation with a song performance. This causes the trigger to always pick segments from a region that correspond with the currently active section in the song. If the trigger is operating in one of the Play or Momentary modes, this also forces the trigger to synchronize its playback with the current position in the section.

Mode 906 allows the trigger to define a content segment as being in one of three modes:

Primary: The primary segment defines the underlying music. In a preferred embodiment, only one content segment at a time can be presented as the primary content segment. If two or more triggers are configured such that the content segments associated therewith are the primary segments, then as one trigger is activated, its content segment immediately replaces the previous primary segment. The primary segment usually provides the underlying musical parameters, including time signature, key, and tempo. Generally, for most songs, one or two triggers will be configured such that their content segments are primary segments. Most other triggers are configured such that their content segments are secondary segments. In song mode, the master trigger should be configured in primary mode while all slave triggers are configured in secondary mode.
Secondary: Secondary content segments play without replacing other Segments. That is, more than one secondary content segment can be presented at a time.
Controlling: Controlling content segments override control information that the primary segment normally provides. This is useful to introduce changes in tempo, groove level, and even underlying chord and key. These can be layered as well.

Start Resolution 908 determines the timing at which the content segment should start or stop when the trigger is first activated. When a trigger is operating in pulsed mode, the first content segment associated therewith is presented after the trigger is first activated, based on the start resolution. Then there is a delay, as programmed in pulse delay 978, after which an additional content segment is presented. Such a configuration greatly reduces the likelihood of unintended double trigger activation.

Pulse resolution 914 selects the interval between subsequent content segment presentations when the trigger operating in pulsed mode. Because pulse resolution 914 is different from start resolution 908, it allows start resolution 908 to be very short so the first content segment can be quickly presented, then after the pulse delay 978 period, subsequent content segments are presented based on the timing defined in pulse resolution 914.

When a pulse is first triggered, it usually will be configured to begin content presentation as soon as possible, to give the user a sense of instant feedback. However, subsequent pulses might need to align with a broader resolution for the pulsed content to be properly presented. Thus, two timing resolutions are provided. The start resolution, which is typically a very short interval, or 0 for immediate response, which sets the timing for the first content segment. In other words, the time stamp from activating the trigger is quantized to the start interval, and the resulting time value is used to set the start of the first note. However, subsequent notes are synchronized to the regular pulse interval. In this way, an instant response is provided that slaves to the underlying rhythm or other aspect of the content.

Freewheel 912 forces subsequent pulses to stay locked to the timing of the first pulse, yet be played at the interval determined by pulse resolution 914. By default, the pulse interval locks to the time signature, as set by the start of the content segment. However, there may be instances when it should lock to the start of the pulse. The Freewheel option forces the subsequent pulses to stay locked to the timing of the first pulse, yet be presented at the interval determined by the pulse resolution.

There are preferably at least two ways to configure the system such that multiple content segments will play within a region. The simplest is to create the content segments as separate files and list them within the region definition. An alternative is to divide a content segment into pieces, with each piece presented separately while incrementing through the content segment. This later alternative is implemented using step option 918. For trigger modes that rely extensively on performing multiple content segments in quick succession, stepping is an efficient alternative to creating a separate file for each content segment. To prepare for stepping, the composer or content segment creator uses DirectMusic Producer, distributed by Microsoft Corporation of Redmond, Wash., or another such computer software application, to put markers in a content segment. When these markers exist in a content segment, activating step option 918 effectively causes the trigger to treat each snippet between markers as a separate content segment.

As an alternative to entering markers in content segments, a composer can simply activate step mode 918, and then define a step interval 920. When a step interval 920 is defined, the trigger will automatically break the content segment into pieces, all of the same size. In the embodiment illustrated in FIG. 9, step interval 920 defines time interval to be used, and multiplier 922 allows the actual interval to be otherwise extended. By way of example, without intending to limit the present invention, if step interval 920 was set to 1, and multiplier 922 was set to 2, the interval would be 2 bars. If a content segment already has markers within it, step interval 920 is preferably ignored.

If the trigger mode is set to pulsed or one shot, more than one instance of a content segment can be simultaneously presented, if so desired. Polyphony 924 determines the number of instances allowed. For example, with a polyphony setting of 1, each content segment start automatically cuts off the previous content segment. Alternatively, with a polyphony setting of 4, four content segments will be presented and allowed to overlap. If a fifth content segment is presented, it will cause the first content segment to be cut off. If the composer configures both controlling segments and polyphony of greater than 1, the results may be unpredictable when because several content segments may compete to control the same parameters.

A master content presentation intensity slider 926 preferably controls the overall intensity level of the content presented in association with the trigger. Alternatively, a composer can enter the intensity in numeric form using text box 928.

In addition to the trigger-specific settings described above, a set of attributes is also associated with each content segment in list 960. In an auditory-enabled embodiment, this set of attributes preferably includes, but is not limited to:

Intensity 942—Each content segment can have its own intensity level, in addition to the intensity setting associated with the trigger.

Transpose 946—This attribute allows the composer to shift the pitch, brightness, scent, or other characteristic of the content segment up or down. In an auditory-enabled embodiment, transpose 946 may allow a pitch shift of up to two octaves.

Play start 950 and play end 952—The content segment can be configured such that it is presented beginning from a specific point within the content segment, and ending at another point. This allows the same content segment to be used in different places by selecting different areas within the content segment.

Loop start 954, loop end 956, and repeat 958—These attributes allow a composer to specify that all or a portion of the content segment is to be repeatedly presented. If a loop start 954 is entered, each time the loop is repeated, the loop begins at the time specified therein. If a loop end 956 is specified, the loop jumps to the loop start 956 after the time specified in loop end 956. Repeat 958 specifies the number of times the loop is to be repeated.

By pressing the play button 970, the composer can cause the system to present the content segment using to the attributes specified in FIG. 9.

The composer can save the trigger configuration by giving the set of settings a unique name 900 and clicking OK 976. The composer can also add a comment 936 to further describe the functionality associated with that particular trigger configuration. Should the composer wish to start over, the composer can click cancel 974, and any unsaved changes will be deleted.

The system preferably allows the composer to group individual trigger configurations into programs, with each program including the triggers to which the individual trigger configurations have been assigned. A program is simply a set of programs that are bundled together so a performer can quickly switch between them. It should be noted that, for added flexibility, a plurality of system-level configurations can share the same programs.

Although each trigger within a program is free to perform independently, the present invention allows the triggers to work together. To accomplish this, a composer preferably builds content segments that play well together. However, such content segment combinations, on their own, can get boring pretty quickly. It helps to have the content evolve over time, perhaps in intensity, key, orchestration, or the like. This can be accomplished by authoring multiple trigger/content segment configurations and swapping in a new set of these for one or more triggers at appropriate points in the performance. The song mechanism provides such a solution. A song is a series of sections, typically with names like "Verse" and "Chorus". Each section may contain nothing more than a name and duration, but they provide the minimum required to map the layout of the song. The program can walk through the song sections in sequential order, either by waiting for a time duration associated with each section to expire, or by switching to the next section under the direct control of one of the triggers (e.g., using the Song Advance trigger mode described above). The program defines the song, including the list of sections. In turn, as described above, each trigger can have one or more regions associated therewith.

Figure 7:
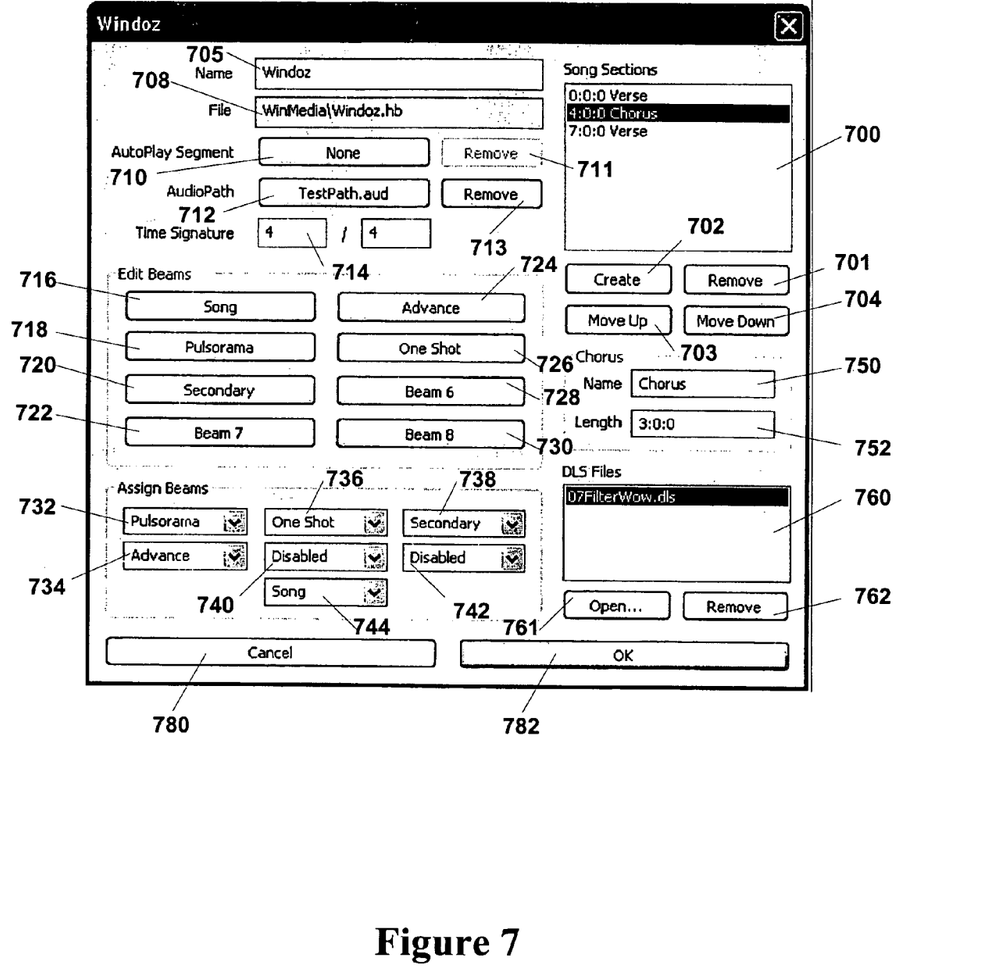
FIG. 7 is a screen capture of a sample program creation user interface.

FIG. 7 is a screen capture of a sample program creation user interface. As illustrated in FIG. 7, each program is preferably given a unique name (field 705). The location at which the program is stored may also be presented for reference (field 708). The user interface preferably lists the song sections defined within the program (list 700), and allows the composer to create (button 702), remove (button 701), and revise the order of such song sections (buttons 703 and 704). The program creation user interface also allows the composer to associate trigger configurations with the program (buttons 716, 718, 720, 722, 724, 726, 728, and 730), and to assign the trigger configurations to specific triggers (drop-down boxes 732, 734, 736, 738, 740, 742, and 744).

In an auditory-enabled embodiment, content segments authored in DirectMusic Producer, and traditional MIDI files that use the General MIDI sound set, can automatically link and load the Downloadable Sound ("DLS") instruments they use. However, traditional MIDI files that do not use the General MIDI sound set cannot readily access the necessary support files. It is therefore preferable to allow the composer to specify, by clicking Open button 761, one or more DLS files to be loaded in conjunction with the program. The DLS files associated with the program are preferably listed in DLS file list 760 or a similar interface.

In addition, the user interface illustrated in FIG. 7 allows a composer to specify an AutoPlay content segment. When a program first activates (such as when switching between programs), it is often desirable present a content segment that initializes the performance. By way of example, without intending to limit the present invention, in an auditory-enabled embodiment, the content segment may set up instruments, set the tempo, or set the time signature such that subsequently presented content segments will be properly presented, regardless of which trigger is activated first. The program carries one special content segment, called the AutoPlay Segment, which it runs immediately upon activation, and this content segment can be selected using button 710. If an AutoPlay Segment is accidentally defined, clicking remove button 711 will remove that setting from the program.

In an auditory-enabled embodiment, a program can also have an AudioPath associated therewith. An AudioPath preferably defines one or more effects filters to be loaded and run against the content segments as they are triggered. The user interface illustrated in FIG. 7 allows the composer to specify the AudioPath using button 712, and to remove the AudioPath using button 713.

Time signature section 714 of the user interface allows the composer to set a default time signature for the program. The time signature can be used when arranging song sections, editing content segment playback points, or displaying the current song position as the content is being presented.

The present invention also preferably allows composers and/or performers to group programs together to create a system-level configuration file. Such system-level configuration files can be created using a user interface similar to that illustrated in FIG. 11. Such a user interface preferably lists all programs contained in the system-level configuration file (list 1100), provides options for naming the system-level configuration (field 1180), and allows the composer to easily create new programs (button 1110), add previously crated programs (button 1190), edit a previously created program (button 1120), remove a program (button 1160), and organize the list of programs (buttons 1150 and 1155). The program list preferably displays all of the programs that belong to the system-level configuration. Each program can have a name, numeric ID based on its position in the program list, and other attributes associated therewith. The name, numeric ID, and/or other attributes may be transmitted to the user interface as a performance is occurring, thus providing the performer with information about the program being performed. By way of example, in the embodiment illustrated in FIGS. 2-4, the numeric ID can be displayed on display 220.

In FIG. 6, a system-level configuration named "Windoz" has been loaded. In this configuration, the Pulsorama trigger configuration illustrated in FIG. 9 has been assigned to the first trigger, trigger 610. The comment associated with that trigger configuration appears below the trigger, in block 612. Additional trigger configurations have been assigned to triggers 615, 620, 625, 630, and 640. No trigger configuration has been assigned to trigger 635, as is indicated by the "empty" text therein. The system also preferably displays the current program name and/or number (block 600), for easy reference by the performer.

When the performer enables the triggers by clicking button 695, the user interface illustrated in FIG. 6 can be used by the performer to present content to an audience. The performer can trigger the presentation of the AutoPlay content segment associated with the current program by clicking AutoPlay button 690, and can trigger the presentation of a previously recorded presentation using Play button 685. The performer can record his or her performance by clicking button 680, adjust the tempo of the performance by adjusting slider 664 or entering a numerical value in text box 666. Additional information useful to the performer, including the song position 662 and various latency measurements (644, 648, and 660) may also be provided.

Although applicant has described applicant's preferred embodiments of the present invention, it will be understood that the broadest scope of this invention includes such modifications as diverse shapes, sizes, materials, and content types. Further, many other advantages of applicant's invention will be apparent to those skilled in the art from the above descriptions, including the drawings, specification, and other contents of this patent application and the related patent applications.

I claim as my invention:

1. A music instrument configured to allow a user to compose musical sounds, comprising:
    a plurality of triggers;
    a processor,
    a controller responsive to the plurality of triggers, and configured to generate control signals as a function of the triggers selected by the user;
    a plurality of music programs, the processor configured to generate an electronic signal as a function of the controller control signals and the plurality of music programs; and
    at least one sound generator configured to generate audible said musical sounds as a function of the electronic signal; and
    wherein each said music program comprises sound elements comprising a subset of a musical composition, the music programs are correlated to each other, and the generated audible musical sounds are synchronized to each other.

2. The music instrument as specified in claim 1 wherein when one of the triggers is in a first state for a prolonged period of time successive said audible musical sounds are generated.

3. The music instrument as specified in claim 1 wherein the audible musical sounds are sympathetic.

4. The music instrument as specified in claim 2 wherein the audible musical sounds are sympathetic.

5. The music instrument as specified in claim 1 wherein the sound generator is a synthesizer.

6. The music instrument as specified in claim 1 wherein the controller comprises a trigger circuit configured to determine when the triggers have changed state.

7. The music instrument as specified in claim 1 wherein each of the music programs are a subset of a song.

8. The music instrument as specified in claim 1 wherein the triggers are configured to be controlled by a user.

9. The music instrument as specified in claim 8 wherein the triggers are configured to include an electromagnetic beam.

10. The music instrument as specified in claim 8 wherein the triggers are configured to be controlled by a user's forger.

11. The music instrument as specified in claim 10 wherein the audible musical sounds are sympathetic.

12. The music instrument as specified in claim 10 wherein the triggers are configured such that the plurality of the triggers can be simultaneously controlled by the user's fingers.

13. The music instrument as specified in claim 12 wherein the audible musical sounds are sympathetic.

14. The music instrument as specified in claim 1 wherein one said music program is associated with one of the plurality of triggers.

15. The music instrument as specified in claim 1 wherein one said music program is selectively associated with one of the plurality of triggers.

16. The music instrument as specified in claim 14 wherein the music programs are sympathetic.

17. The music instrument as specified in claim 16 wherein the audible musical sounds are sympathetic.

18. A music instrument configured to allow a user to compose musical sounds, comprising:
   a plurality of triggers;
   a control module responsive to the plurality of triggers;
   a plurality of music programs, the control module configured to generate electronic signals as a function of the plurality of music programs and the plurality of triggers, wherein each said music program comprises sound elements comprising a subset of a predetermined musical composition; and
   a sound generator configured to generate synchronized sympathetic audible musical sounds as a function of the electronic signals.

19. The music instrument as specified in claim 18 wherein one said music program is associated with one of the plurality of triggers.

20. The music instrument as specified in claim 19 wherein the association of one said music program is configured to be selectively associated with one of the plurality of triggers.

21. The music instrument as specified in claim 18 wherein when one of the triggers is in a first state for a prolonged period of time successive said audible musical sounds are generated.

22. The music instrument as specified in claim 18 wherein the sound generator is a synthesizer.

23. The music instrument as specified in claim 18 wherein the controller comprises a trigger circuit configured to determine when one triggers has changed state.

24. The music instrument as specified in claim 18 wherein the sound elements of each said music program are correlated to the sound elements of another said music program.

25. The music instrument as specified in claim 18 wherein the musical composition is a subset of a song.

26. The music instrument as specified in claim 18 wherein the triggers are configured to be controlled by a user.

27. The music instrument as specified in claim 26 wherein the triggers are configured to include an electromagnetic beam.

28. The music instrument as specified in claim 26 wherein the triggers are configured to be controlled by a user's finger.

29. The music instrument as specified in claim 28 wherein the triggers are configured such that the plurality of the triggers can be simultaneously controlled by the user's fingers.

* * * * *